(12) United States Patent
Halaas et al.

(10) Patent No.: US 6,760,744 B1
(45) Date of Patent: Jul. 6, 2004

(54) DIGITAL PROCESSING SYSTEM

(75) Inventors: Arne Halaas, Trondheim (NO); Børge Svingen, Hommelvik (NO); Geirr I. Leistad, Sandvika (NO)

(73) Assignee: Fast Search & Transfer ASA, Oslo (NO)

( * ) Notice: Subject to any disclaimer, the term of this patent is extended or adjusted under 35 U.S.C. 154(b) by 0 days.

(21) Appl. No.: 09/581,145

(22) PCT Filed: Oct. 8, 1999

(86) PCT No.: PCT/NO99/00308
§ 371 (c)(1),
(2), (4) Date: Jun. 30, 2000

(87) PCT Pub. No.: WO00/22545
PCT Pub. Date: Apr. 20, 2000

(30) Foreign Application Priority Data

Oct. 9, 1998 (NO) .......................................... 19984746

(51) Int. Cl.[7] .............................................. G06F 15/16
(52) U.S. Cl. ..................... 709/201; 709/249; 709/252; 375/377
(58) Field of Search ................................ 375/259, 286, 375/377; 709/200, 201, 249, 250, 252

(56) References Cited

U.S. PATENT DOCUMENTS

| | | | |
|---|---|---|---|
| 4,251,861 A | 2/1981 | Mago | |
| 4,860,201 A | 8/1989 | Stolfo et al. | |
| 5,561,768 A | 10/1996 | Smith | |
| 5,884,046 A | * 3/1999 | Antonov | ...................... 709/238 |
| 6,052,712 A | * 4/2000 | Badovinatz et al. | ......... 709/205 |

* cited by examiner

*Primary Examiner*—Stephen Chin
*Assistant Examiner*—Dac V. Ha
(74) *Attorney, Agent, or Firm*—Birch, Stewart, Kolasch & Birch, LLP (57) ABSTRACT

A digital processing system P, configured as a regular tree with n+1 levels $S_0, S_1, S_2 \ldots S_n$ and degree k, provided in the form of a circuit $P_n$ on the level $S_n$ and forms the root node of the tree, an underlying level $S_{n-q}$, q=1,2, ... n−1, in the circuit P provided nested in the $K^{q-1}$ circuits $P_{n-q+1}$ on the overlying level $S_{n-q+1}$, each circuit $P_{n-q+1}$ on this level including k circuits $P_{n-q}$. A q=n defined zeroth level in the circuit $P_n$ includes from $K^{n-1}+1$ to $K^n$ circuits $P_0$ which form kernel processors in the processing device P and on the level $S_0$ and constitute the leaf nodes of the tree, the kernel processor $P_0$ being provided nested in each of the circuits $p_1$ on the level $S_1$. Each of the circuits $P_1, P_2, \ldots P_n$, includes a logic unit E which generally is connected with circuits $P_0$, $P_1, \ldots P_{n-1}$. Each of the circuits $P_0, P_1, \ldots P_n$ has additionally identical interfaces I, such that $I_{P0}-I_{P1}- \ldots I_{Pn}$.

12 Claims, 12 Drawing Sheets

DIGITAL PROCESSING SYSTEM

This application is the national phase under 35 U.S.C.§371 of PCT International Application No. PCT/NO 99/00308 which has an International filing date of Oct. 8, 1999, which designated the United States of America.

BACKGROUND OF THE INVENTION

The invention concerns a digital processing device P, particularly for processing of digital data and signal structures, wherein the data and signal structures comprise repeated sequences and/or nested patterns, and wherein the processing device P generally is configured as a regular tree with n+1 levels $S_0, S_1, \ldots S_n$ and of degree k.

DESCRIPTION OF THE RELATED ART

Processing of large data volumes with use of repeated or recursive operations on very large data volumes can even in a restricted number often be a bottleneck when using conventional microprocessors and is thus amenable to massively parallel solutions wherein a very large number of processing elements simultaneously execute different operations in parallel on a large data stream, but possibly also parallel operations on several data streams. If such large data volumes appear in a form of data or signal structures with repeated sequences and/or nested patterns, the processing can be made more effective by being realized in parallel on the same or several different levels From U.S. Pat. No. 486,020 (Stolfo & al.) there is known a parallel processing device structured as a binary tree, wherein a very large number of processors each with their own I/O unit are used. Generally Stolfo & al. discloses a computer with a very large number of processors connected in a binary tree structure such that each processor apart from those which constitute the root and the leaves of the tree has a single parent processor and two child processors. The processors typically work synchronously with data which are transmitted thereto from the parent processor and communicate the results on to the nearest succeeding processors, that is the parent processors' children. Simultaneously the child processors and the parent processor may also communicate with each other. According to Stolfo & al. each node constitutes a processing element which comprises a processor in the proper sense, a read/write memory or a random access memory, and an I/O device. The I/O device provides interfaces between each processing element and its parent and child processing elements such that a substantial improvement in speed whereby data are sent through the binary tree structure is obtained. As the binary tree structure has a processing element in every single node, the processing device will generally comprise $2^n-1$ processing elements, that is 1023 processing elements if the binary tree is realized with 10 levels. In a preferred embodiment the known parallel processing device has a clock frequency of 12 MHz, which in the case of using a tree with 1023 processors which each has an average instruction cycle time of 1.8µs, provides a processing performance of about 570 million instructions per second.

A binary parallel processor of this kind may for instance be well suited for handling decomposable or partitionable data processing problems, for instance searching in large information volumes. A partitionable search problem can be defined as a problem where a query about a relation between an object x and an object set corresponds to a repeated use of a commutative and associative binary operator b which has an identity and a primitive query which is applied between a new object x and each element f in the set F. One then has a partitionable search problem when the logic function OR is combined with the primitive query "is x=f" applied between the object x and each element f i F. As mentioned by Stolfo & al a problem which consists of answering a query about set F, may be answered by combining the answers of the queries applied to arbitrary subsets of F. The problem is in other words partitionable or decomposable and well suited for rapid execution by means of parallel processing. The set F is partitioned in a number of arbitrary subsets equal to the number of available processors. The primitive query q is then applied in parallel in each processor between the unknown x which is communicated to all processors and the locally stored element f in the set F. The results are then combined in parallel by $\log_2 N$ repetitions of the operator b, as a number of computations first is executed on N/2 adjacent pairs of processors and then a corresponding number of computations on N/4 pairs of processors with the results from the first computations. The operations hence move during the process to overlying levels in the binary tree, in other words from child processors to the parent processor etc. and are repeated in parallel on each level.

There is however a number of data processing problems wherein the data and signal structures comprise repeated sequences and/or nested patterns which are such that a processing device of the kind that is disclosed in U.S. Pat. No. 4,860,201 does not provide the desired flexibility or may not at all be suited for handling the problem. A binary tree structure as disclosed therein presupposes in principle that the problem can be binary partitioned and that operations take places in parallel on the same level. However, there may be problems which demand another degree of decomposition and where processing must be able to take place in parallel, but on different levels in the tree structure. The problems can also be partitioned such that it will be desirable with a larger partitioning capacity on one and the same level in some of the subtrees in the tree structure, and this in practice requires solutions which takes its starting point in a general tree structure which not only has an arbitrary number of levels, but also arbitrary degree, while nodes in subtrees not are only connected with the parent node of the tree in question, but for instance may be connected to a node on the same or underlying levels in neighbour trees. An increased degree of connectivity in a tree structure with a desired number of levels and of arbitrary degree will hence make it possible to reconfigure the original tree structure, either in the form of reduced trees or simple or complex graphs. Simultaneously can one or more of the leaf nodes be combined and take over the function of the parent node in question.

SUMMARY OF THE INVENTION

The object to the present invention is thus to provide a processing device which particularly suited for processing large data volumes in massive parallelism and on different levels in a general tree structure, but which simultaneously also can be configured arbitrarily as nested circuits on different levels and preferably under determined conditions such that a selected configuration on the given level is generated recursively by a configuration on an underlying level. Particularly it is the object that the processing device according to the invention shall be able to realize an MIMD processing device, that is a processing device which works with multiple instructions and multiple data.

The above-mentioned and other objects are obtained according to the invention with a digital processing device which is characterized in that the processing device P is provided in the form of a circuit $P_n$ on the level $S_n$ and forms the root node of the tree, that the nearest level $S_{n-1}$ is provided nested in the circuit $P_n$ and comprises k circuits $P_{n-1}$ which form the child nodes of the root node, that generally an underlying level $S_{n-q}$ in the circuit $P_n$, where $q \in \{1,2 \ldots n-1\}$, comprises $k^q$ circuits $P_{n-q}$ provided nested in the $k^{q-1}$ circuits $P_{n-q+1}$ on the overlying level $S_{n-q+1}$, each circuit $P_{n-q+1}$ on this level comprising k circuits $P_{n-q}$, that a defined zeroth level $S_{n-q}=S_0$ in the circuit $P_n$ for q=n comprises from $k^{n-1}+1$ to $k^n$ circuits $P_0$ which constitute kernel processors in the processing device P and on this level $S_0$ form leaf nodes in the tree, the kernel processor $P_0$ being provided nested in a number of 1 to k in each of the $k^{n-1}$ circuits $P_1$ on the level $S_1$, that each of the circuits $P_1, P_2 \ldots P_n$ on respective levels $S_1, S_2 \ldots S_n$ comprises a logic unit E which generally is connected with those circuits $P_0, P_1 \ldots P_{n-1}$ on the respective nearest underlying level $S_0, S_1 \ldots S_n$ provided nested in the respective circuits $P_1, P_2, \ldots P_n$ and according to choice configures a network of the former circuits in the respective circuits $P_1, P_2, \ldots P_n$, and that each of the circuits $P_0, P_1 \ldots P_n$ has identical interfaces I.

Advantageously a first embodiment of the processing device according to the invention is characterized in that the zeroth level $S_0$ comprises $k^n$ kernel processors $P_0$, that a kernel processor $P_0$ recursively maps a circuit $P_1$ on the overlying level with a mapping factor r=k, such that the tree is a unreduced or complete tree, and that generally a circuit $P_{n-q}$ on the level $S_{n-q}$ maps a circuit $P_{n-q+1}$ on the overlying level $S_{n-q+1}$ recursively with the factor r=k.

Further a second embodiment of the processing device according to the invention is advantageously characterized in that the zeroth level $S_0$ comprises $rk^{n-1}$ kernel processors $P_0$, 1<r<k, that a kernel processor $P_0$ maps a circuit $P_1$ on the overlying level $S_1$ with the mapping factor r, 1<r<k, such that the tree is a symmetrically reduced or balanced tree, and that generally a circuit $P_{n-q}$ on all levels from the level $S_1$ maps a circuit $P_{n-q+1}$ on the overlying level $S_{n-q+1}$ recursively with the mapping factor r=k.

Finally a second embodiment of the processing device according to the invention is advantageously characterized in that respectively from 1 to k kernel processors are provided nested in each circuit $P_1$ on the level $S_1$, that at least one of the circuits $P_1$ comprises at least 2 and at most k-1 kernel processors $P_0$, such that the total number of kernel processors $P_0$ on the level $S_0$ is at least $k^{n-1}+1$ and at the most $k^n-1$ and the tree becomes an asymmetrically reduced or unbalanced tree, and that generally a circuit $P_{n-q}$ on the level $S_{n-q}$ is mapped by the circuits $P_{n-q-1}$ nested in the respective circuit $P_{n-q}$.

According to the invention the kernel processor $P_0$ advantageously comprises at least one combinatorial unit C and a memory unit M connected with at least one combinatorial unit C, at least a part of the memory unit M preferably being configured as a register unit R. In the latter case can preferably then at least one combinatorial unit C and the register unit R be configured as an arithmetic logic unit ALU. Advantageously comprises according to the invention the logic unit at least one combinatorial unit C and a register unit R connected with the at least one combinatorial unit, the at least one combinatorial unit C preferably being a multiplexer. It is then advantageous that the logic unit E in a circuit $P_{n-q}$ is adapted to be connected with the logic unit E in a corresponding circuit $P_{n-q}$ on the same level as $S_{n-q}$ in a neighbour tree.

It is also advantageous that the logic unit E in a circuit $P_{n-q}$ is adapted to be connected with the logic unit E in circuits $P_{n-q-1}, P_{n-q-2}, \ldots P_1$ on respective underlying levels $S_{n-q-1}, S_{n-q-2}, \ldots S_1$ in a neighbour tree.

Finally it is also advantageous that the logic unit E in a circuit $P_{n-q}$ is adapted to be connected with one or more kernel processors $P_0$ in a neighbour tree, either directly or via the logic unit E in the circuit $P_1$, where the kernel processor $P_0$ or the kernel processors $P_0$ in question are nested.

DESCRIPTION OF THE DRAWINGS

The invention shall now be explained in more detail in connection with exemplary embodiments and with reference to the accompanying drawing, wherein.

DETAILED DESCRIPTION OF THE INVENTION

Figure 1:
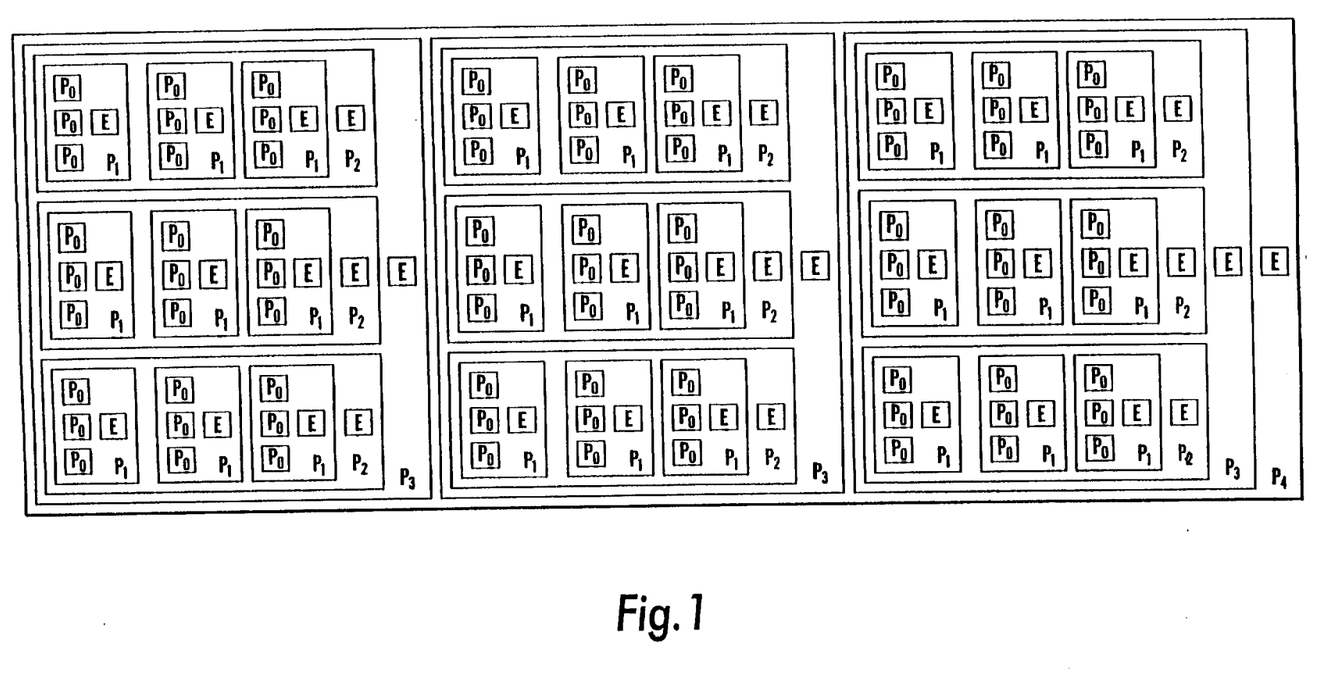
FIG. 1 shows a first embodiment of the processing device according to the invention, FIG. 2 the embodiment in FIG. 1 configured as a regular tree structure, FIG. 3 a second embodiment of the processing device according to the invention configured as a tree structure, FIG. 4a a third embodiment of the processing device according to the invention configured as an asymmetrically reduced tree, FIG. 4b an example of a subtree with leaf nodes in the tree structure which represents the processing device according to the invention, FIG. 4c another example of a subtree with leaf nodes in the tree structure which represents the processing device according to the invention, FIG. 5 schematically the principle for generating the processing device according the invention as a nested circuit by recursive mapping, FIG. 6 an embodiment of the processing device according to the invention as a recursive circuit with three levels and degree four, FIG. 7 another embodiment of the processing device according to the invention as a recursive circuit with four levels and similarly degree four, FIG. 8 possible connections between the nodes in a tree corresponding to the circuit in FIG. 6, FIG. 9 possible connections between the nodes in a tree corresponding to the circuit in FIG. 7, FIG. 10 the circuit in FIG. 6 or FIG. 8 connected as a one-dimensional graph, FIG. 11a schematically an embodiment of a kernel processor in the processing device according to the invention, FIG. 11b schematically an embodiment of a circuit with a logic unit and a kernel processor in the form of a comparator unit for use in a search processor device based the processing device according to the invention, FIG. 12a the comparator unit in FIG. 11b, FIG. 12b the connection of comparators similar to the one in FIG. 12a in order to compare a pattern of for instance 3 characters, and FIG. 12c a balanced binary tree realized with circuits corresponding to the one in FIG. 11b.
Figure 2:
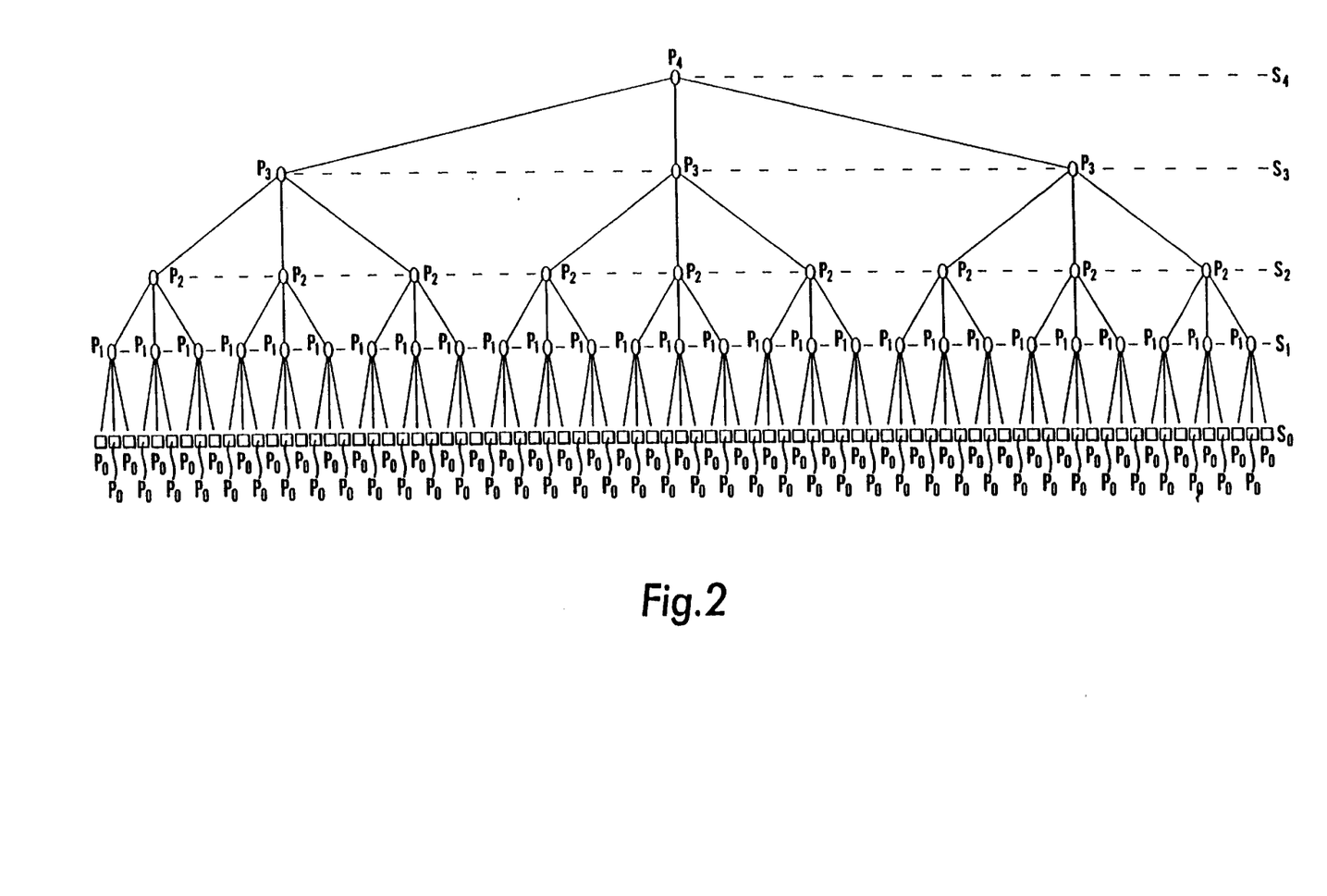

FIG. 1 shows symmetrically the layout of a parallel processing device according to the present invention. Formally the scheme in FIG. 1 can be described as follows: Given a circuit $P_0$ with an interface $I_{P_0}$ and a further circuit E, there can be created a repeated sequence of circuits $P_1, P_2$, $P_3$, with respective interfaces $I_{P_1}, I_{P_2}, \ldots I_{P_n}$ each comprising respectively k circuits $P_0, P_2, \ldots P_{n-1}$ and a single further circuit E, the interfaces I being identical for all circuits $P_0$, $P_1, \ldots P_n$, in other words $I_{P_0} = I_{P_1} = I_{P_2} \ldots = I_{P_n}$. In each case the circuit $P_1$ is configured as a tree network with n+1 levels S and of degree k. Specifically FIG. 1 shows a digital processing device in the form of the circuit $P_4$ which forms a tree with five levels S and of degree 3. This implies as shown in FIG. 1 that the circuit $P_4$ which is located on the level $S_4$, on the underlying level comprises three circuits $P_3$. Each of the circuits $P_3$ on the level $S_3$ is generated with circuits $P_2$ on the underlying level $S_2$, and each of the circuits $P_2$ the level $S_2$ is generated with three circuits $P_1$ on the underlying level $S_1$. Finally, each of the circuits $P_1$ on the level $S_1$ is generated with three circuits $P_0$ on the level $S_0$. The circuits $P_0$ form the proper processing units in the processing device $P_4$ and constitute the kernel processors of $P_4$. As the circuit $P_4$ as shown in FIG. 2 is structured as a ternary tree, this implies that the level $S_0$ comprises a total of $3^4=81$ kernel processors $P_0$, the overlying level $S_1$ 27 circuits $P_1$ and the following level $S_2$ 9 circuits $P_2$. Finally the level $S_3$ has 3 circuits $P_3$. Each of the circuits $P_0, P_1, P_2, P_3$ constitutes the nodes in the tree in FIG. 2. The kernel processors $P_0$ constitute the leaf nodes of the tree and the circuit $P_4$ the root node of the tree. Structured in this way the tree in FIG. 2 appears as a recursive ternary tree, as a circuit on an arbitrary level S maps the circuit on the nearest following overlying level recursively with a mapping factor r which in this case is 3. Each of the circuits $P_1, P_2, P_3, P_4$, additionally comprises a logic unit E, such that the logic units E in all circuits $P_1, P_2, P_3, P_n$ physically regarded constitute the nodes of the tree. By means of the logic unit E can each node of the tree generally be connected with its parent node or its child nodes. Through the logic unit E can also each of the child nodes of the node be mutually connected. Each of the kernel processors which constitutes the leaf nodes of the tree also has respective circuits $P_1$ as parent nodes and can via these be connected mutually. As per se known is the problem which the processing device according to invention shall process, partitioned and the processing executed on the level $S_0$ in parallel by the kernel processors $P_0$. The results from the kernel processors $P_0$ are combined and communicated further by the respective parent node $P_1$. This process is repeated until the final result is present on the circuit $P_4$.

Both the kernel processor $P_0$ and the logic unit E shall be discussed a somewhat greater detail in the following.

Figure 3:
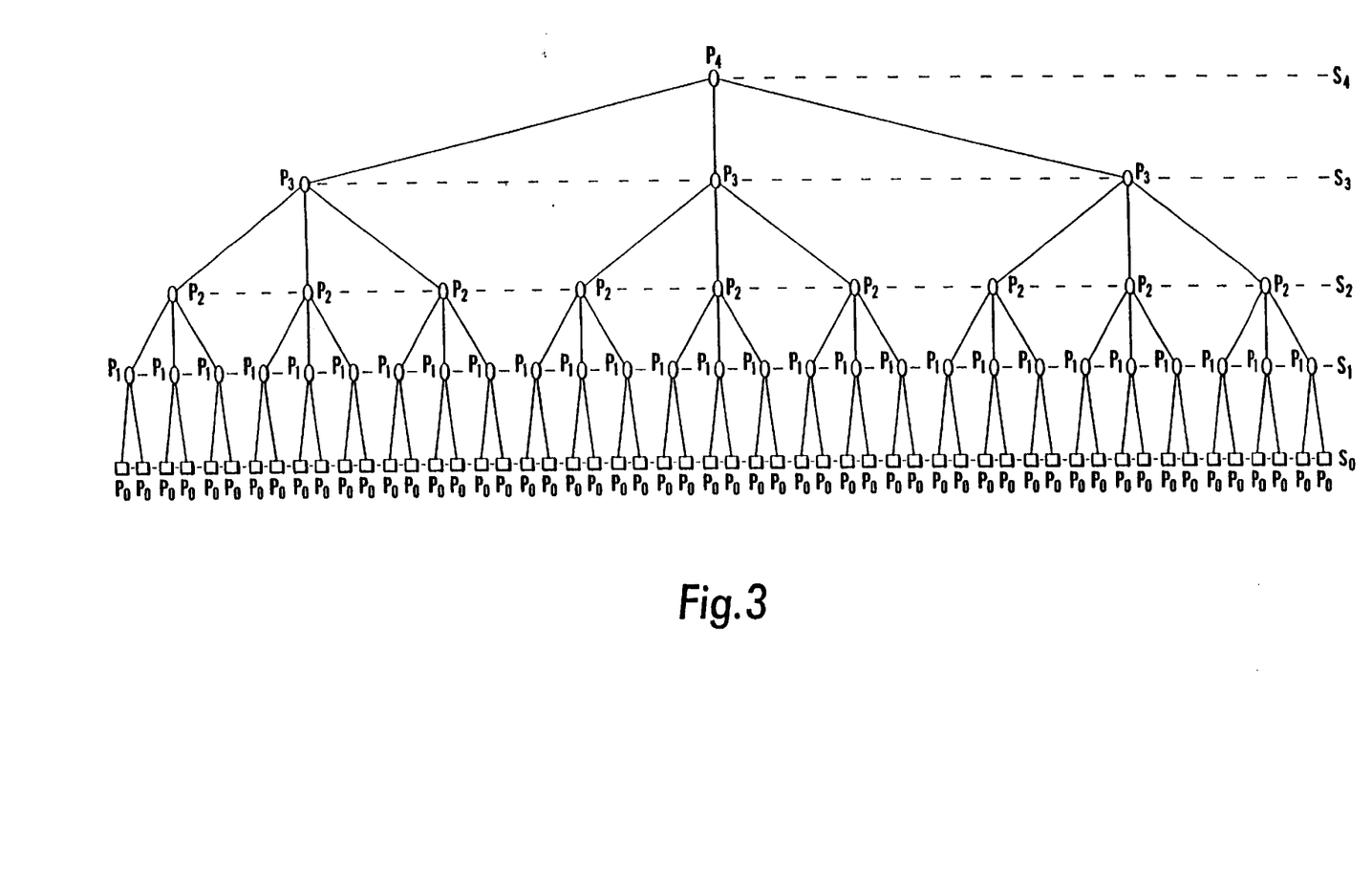

However, the circuit $P_4$ does not need to be realized as a complete or regular recursive tree. It may well be generated as a symmetrically reduced tree and this implies that the number of leaf nodes or number of kernel processors $P_0$ connected with the nodes $P_1$, is reduced such that each circuit $P_1$ comprises 2 or more leaf nodes or kernel processors $P_0$, but in each case less then k kernel processors $P_0$. As the circuits in FIG. 1 has k=3, this implies that the symmetrically reduced tree as shown in FIG. 3, comprises two kernel processors $P_0$ for each circuit $P_1$. The symmetrically reduced tree on FIG. 3 is in other words not regularly recursive, the recursion first from level $S_1$ taking place with a mapping factor 3. Generated as in FIG. 1, each circuit $P_1$ in the tree in FIG. 3 will in addition to the logic unit E comprise only two kernel processors $P_0$. The recursive mapping of circuits on an underlying level to an overlying level implies evidently that these circuits will be nested in a circuit in the overlying level and the whole circuit $P_4$ appears as a nested circuit.

Figure 4A:
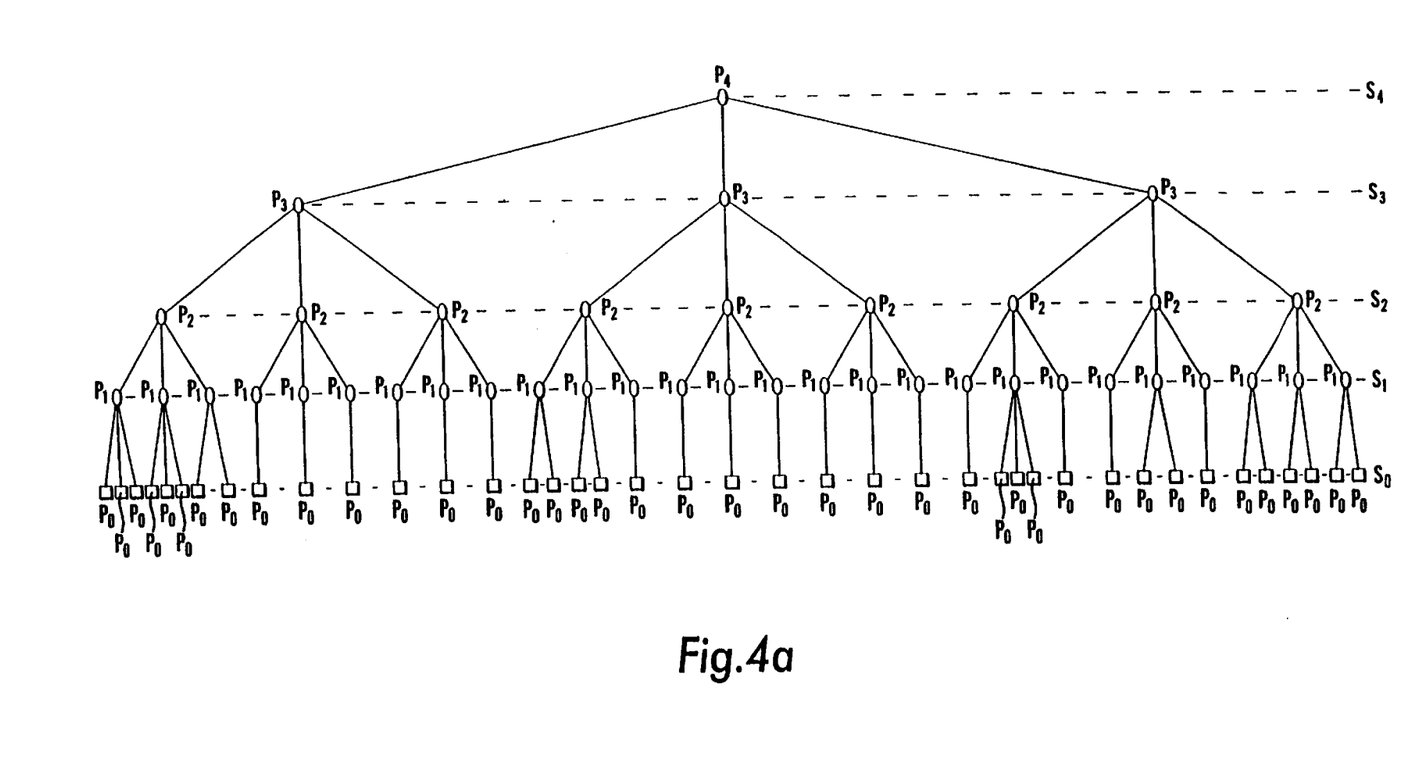

If the circuit is an asymmetrically reduced circuit, it may appear as shown in FIG. 4a. Here some of the nodes $P_1$ regularly have three leaf nodes $P_0$, other nodes $P_1$ only two leaf nodes $P_0$ and yet other nodes $P_1$ only a single leaf node $P_0$. In the latter case the mapping of the parent node becomes an identity mapping thereof, and for the sake of that the logic element then can be left out in the circuits $P_1$. If all circuits $P_1$ comprise only a single kernel processor $P_0$, the tree which generates the circuit $P_4$ will appear as completely reduced, as $P_1=P_0$ and the circuit $P_4$ is transformed into a regular recursive circuit $P_3$ with four levels and 27 kernel processors $P_0$ on the level $S_0$. Is thus the number of levels n+1, a circuit $P_n$ must have at least $k^{n-1}+1$ kernel processors on the level $S_0$ in order not to appear as a completely reduced tree.

Figure 4B:
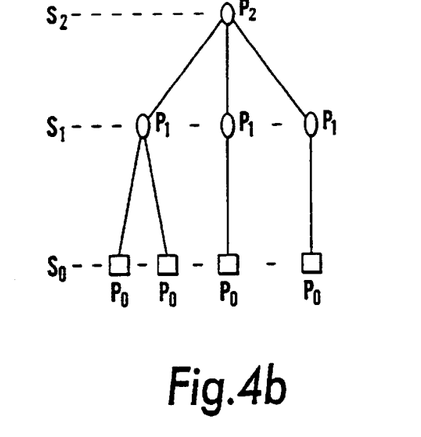
Figure 4C:
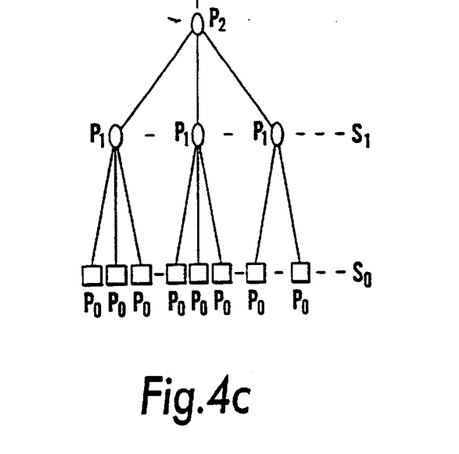

A subtree in a maximally asymmetrical reduced tree is shown in FIG. 4b, this subtree comprising a node $P_2$ with child nodes $P_1$, such that only one of nodes $P_1$ has two kernel processors or leaf nodes $P_0$, while all of the remaining nodes $P_1$ in the tree only has a single leaf node $P_0$, such that $P_1$ in these cases is reduced to $P_0$. With five levels or responding to the circuit in FIG. 1, a circuit $P_4$ configured as in FIG. 4b, that is with two leaf nodes in a circuit $P_1$ and otherwise only one leaf node in each of the remaining nodes $P_1$, would appear as a maximally asymmetrical reduced tree and the number of nodes on the level $S_0$ in other words becomes $3^3+1=28$. Correspondingly a subtree for the node $P_2$ in a minimally asymmetrical reduced tree is shown in FIG. 4c. Here a single node $P_1$ comprises two leaf nodes or kernel processors $P_0$, while all the remaining nodes $P_1$ in the tree as before comprise three leaf nodes $P_0$. This of course implies that a minimally asymmetrical reduced tree corresponding to the circuit on FIG. 1 in this case shall comprise a total of 80 kernel processors $P_0$. A circuit which is generated as the tree shown in FIG. 4, will of course still appear as nested on all underlying levels $S_1, S_2, S_3$, but the mapping will no longer be recursive, as a circuit $P_1, P_2, P_3, P_4$, will be mapped by all circuits which are located on the respective underlying level $S_0, S_1, S_2, S_3$. The advantages of generating the circuit $P_4$ as a symmetrically or asymmetrically reduced tree shall be discussed in more detail in the following.

Figure 5:
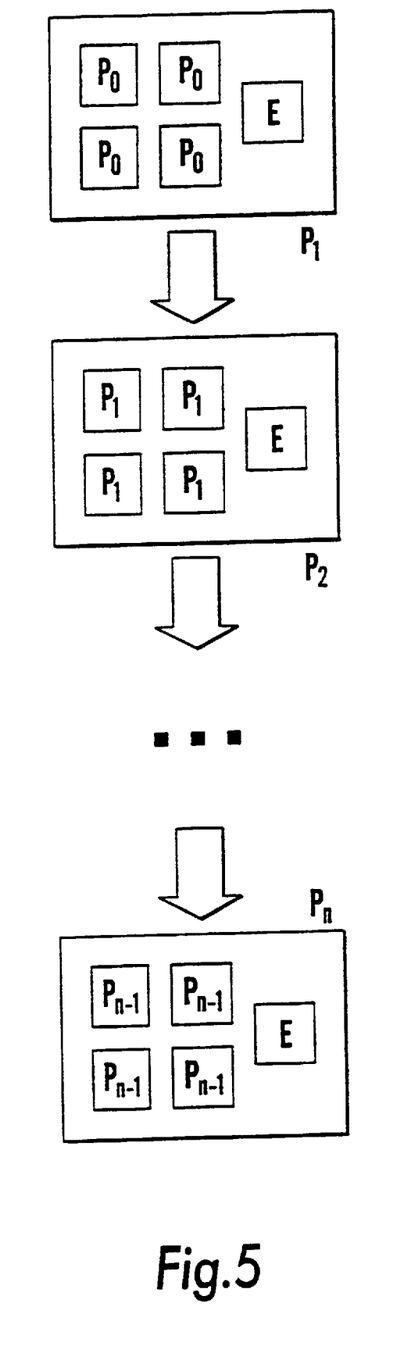

FIG. 5 shows how a recursive self-mapping processing device $P_n$ according to the invention is generated. The circuit $P_n$ is realized as a tree with n+1 levels and of degree k=4. Each of the circuits $P_0, P_1, \ldots P_{n-1}$ is nested in the respective circuits $P_1, P_2, \ldots P_n$ on the nearest overlying level $S_1, S_2, \ldots S_n$. The number of nested levels is then of course n and the circuit $P_n$ shall on the zeroth level $S_0$ defined by the kernel processors $P_0$ comprise a total of $k^n$ kernel processors of this kind. Generally shall the number of circuits $P_{n-q}$ on a level $S_{n-q}$, where q=0,1,2, ... n, be equal to $k^q$.

Figure 6:
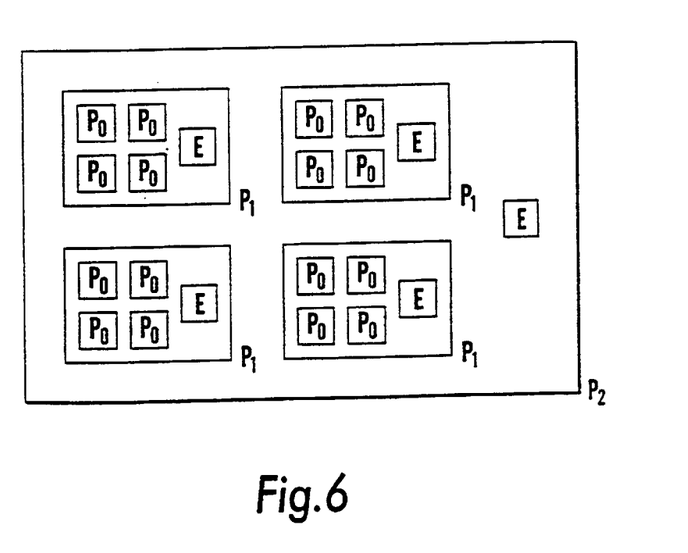
Figure 7:
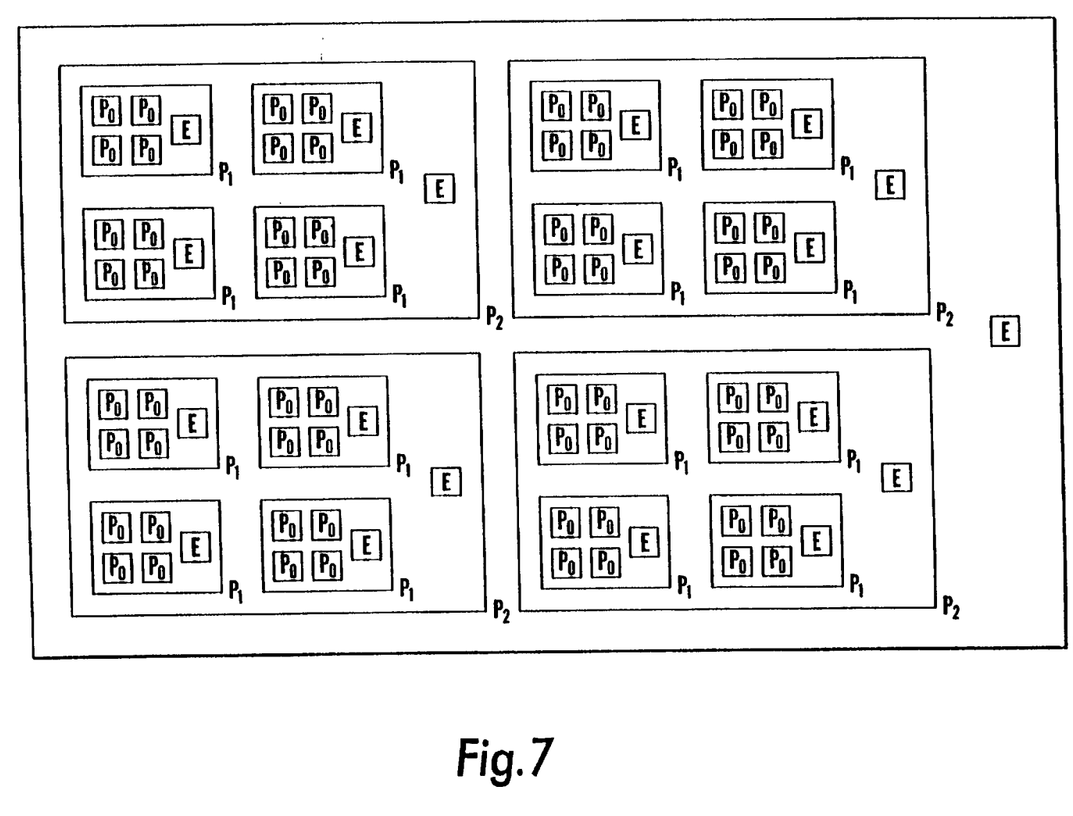

FIG. 6 shows a nested circuit $P_2$ generated as a recursive tree according to the principle in FIG. 5. The circuit $P_2$ comprises the logic unit E and nested on the underlying level $S_1$ four circuits $P_1$ which each in turn comprises the logic unit E and nested on the underlying level four circuits or kernel processors $P_0$. The logic units configure the circuit $P_2$ as a quaternary tree with three levels $S_0, S_1, S_2$, and a total of sixteen kernel processors $P_0$ or leaf nodes on the level $S_0$. Correspondingly FIG. 7 shows a sequentially generated circuit with four levels S and k=4. The circuit in FIG. 7 comprises in other words a quaternary configured tree with a total of 64 kernel processors $P_0$ on the level $S_0$. As before the interfaces I of each circuit $P_0, P_1, P_2, P_3, P_4$ are of course identical.

Figure 8:
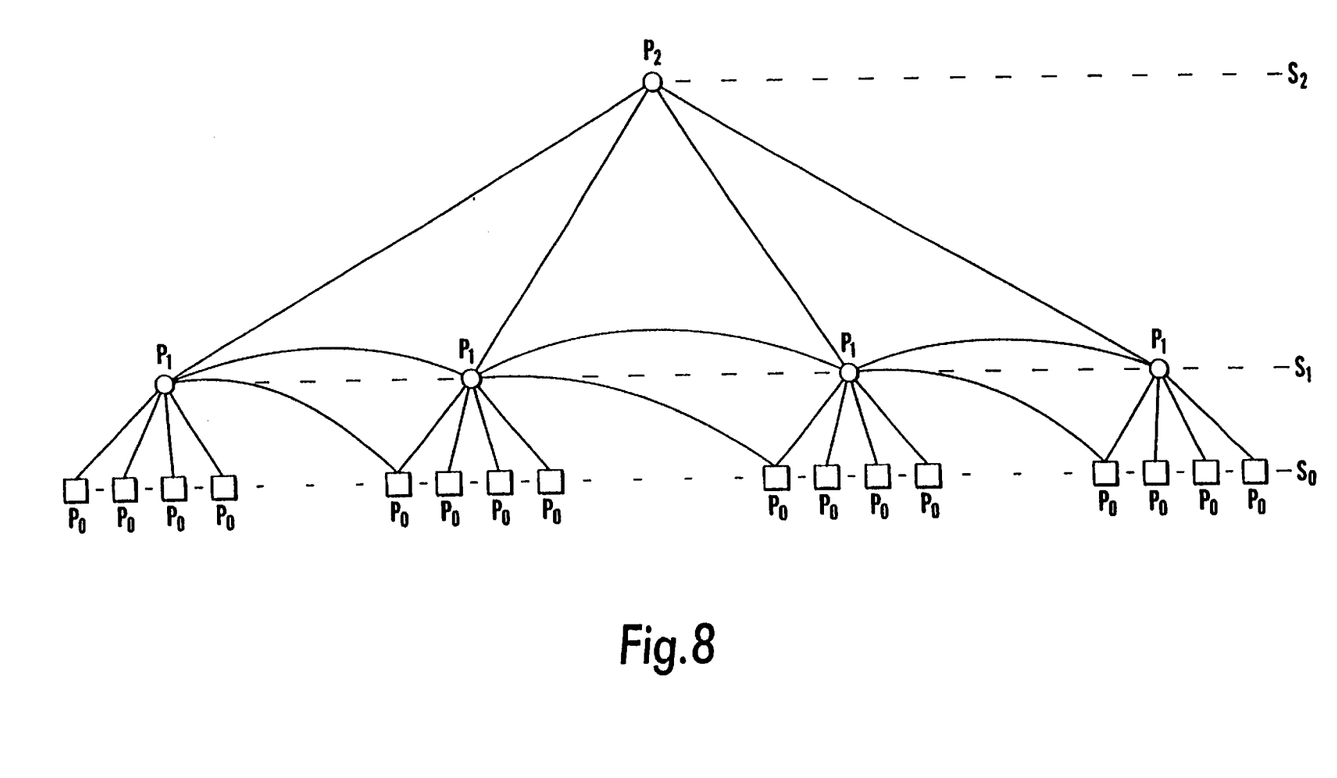

FIG. 8 shows the circuit $P_2$ in FIG. 6 generally configured as a quaternary tree, but furthermore such that for instance the circuits $P_1$, that are the nodes on the level $S_1$, are mutually connected with a kernel processor $P_0$ in the neighbour tree on the level $S_0$. Generally will the logic unit E in one of the nodes $P_1$, $P_2$, ... $P_1$ not only allow a connection upwards and downwards in the subtree wherein the node is located, but also a connection to nodes in neighbour trees within one and the same level or a connection to the nearest-lying node on an underlying level in a neighbour tree. For the circuit in FIG. 6 the node $P_1$ in a subtree hence can be connected to the first leaf node $P_0$ in the neighbour tree etc.

Figure 9:
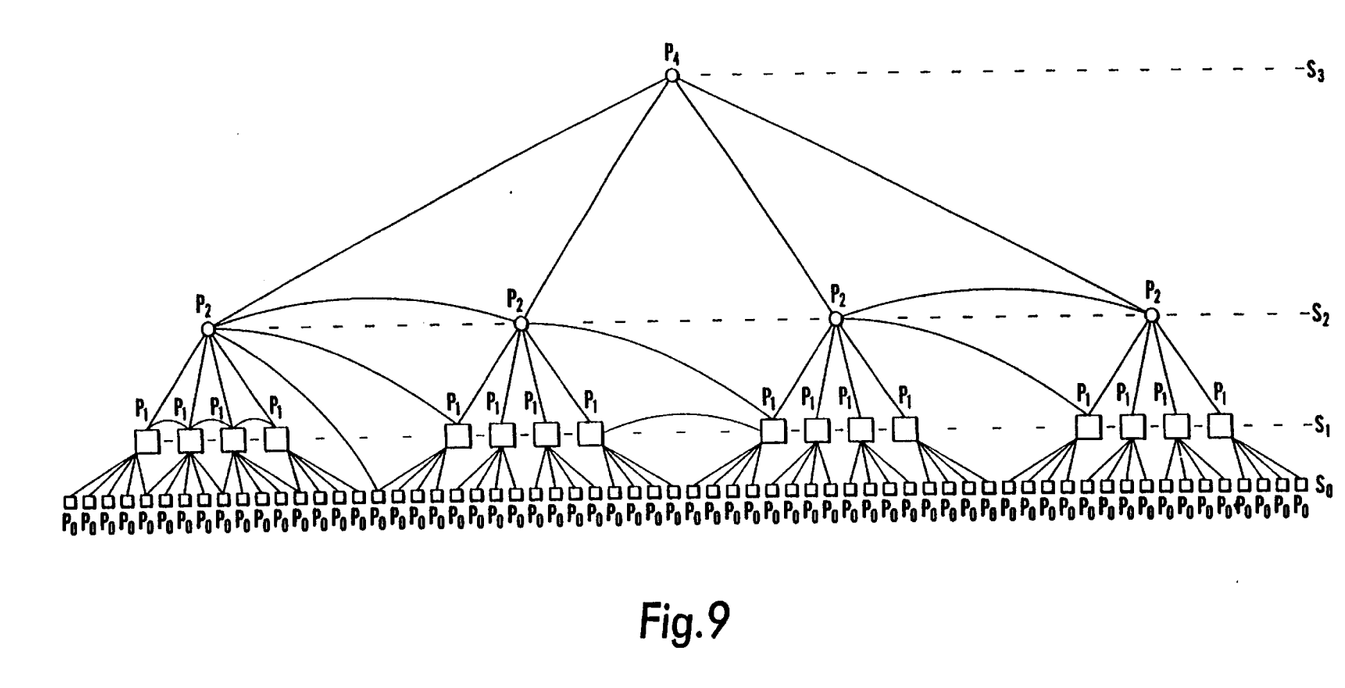

Correspondingly FIG. 9 shows connections in the circuit in FIG. 7, which forms a quaternary tree with four levels and a total of 64 kernel processors. Here again a node on a given level can be connected to the node in the neighbour tree on the same level and to the nearest adjacent nodes in the neighbour tree on an arbitrary underlying level.

Figure 10:
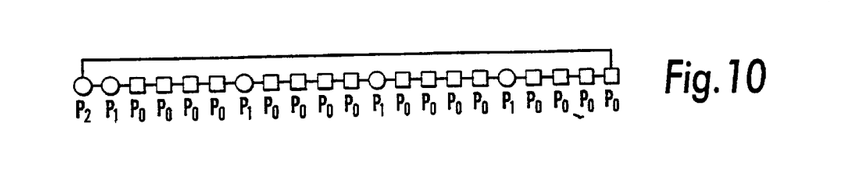

This implies that the general tree structure can be configured via the logic element into more or less complex graphs. An example is shown in FIG. 10, where the circuit $P_2$ in FIG. 6 or FIG. 8 is configured such that $P_2$ in reality forms a one-dimensional graph where the sixteen kernel processors $P_0$ are connected sequentially.

Usually the processing device according to the invention will be realized as a dedicated processing device for a determined task, for instance image processing. With basis in the general tree structure the configuring may take place task-specifically, either operatively or physically. If the configuring takes place operatively, the circuit is via the interface supplied with configuring parameters which realize the appropriate network for the processing. The configuring may then very well imply that the circuit is configured with fewer kernel processors than those which actually are provided in the circuit The processing device according to the invention may then appear as a symmetrically reduced tree, such this is shown in FIG. 3, or an asymmetrically reduced tree, such this is shown in FIG. 4. For some concrete data processing tasks it can namely be required a greater number of kernel processors in one or more subtrees in order to increase the capacity of the processing device for a specific task.

As mentioned, the processing device according to the invention can also appear as a physically reduced tree, whether it is symmetrically or asymmetrically reduced. This implies that the physical circuit solution actually is realized with a smaller number of kernel processors that which is given by the number of levels S in the tree and the degree k. This may be appropriate for providing a circuit technology solution which optimally exploit the real estate conditions on the chip. If the number of kernel processors in a dedicated processing device according to the invention is reduced physically, this implies for instance a reduction in the physical size of the chip or a better exploitation of the real estate of the chip, dependent on the actual architectural solution which is selected. The condition is of course that under every circumstance the task which is assigned to the processing device, is executed.

The circuit $P_0$ defines a zeroth unnested level in the processing device P and constitutes a kernel processor in P.

Figure 11A:
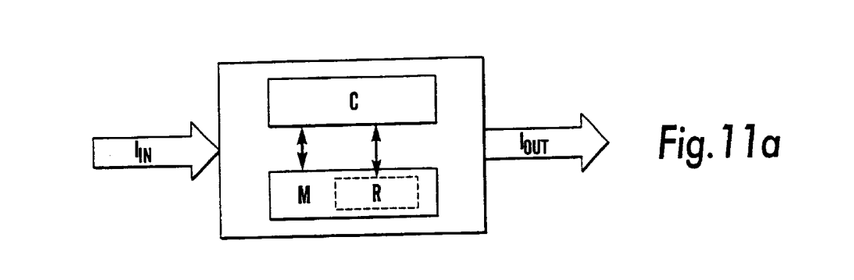
Figure 11B:
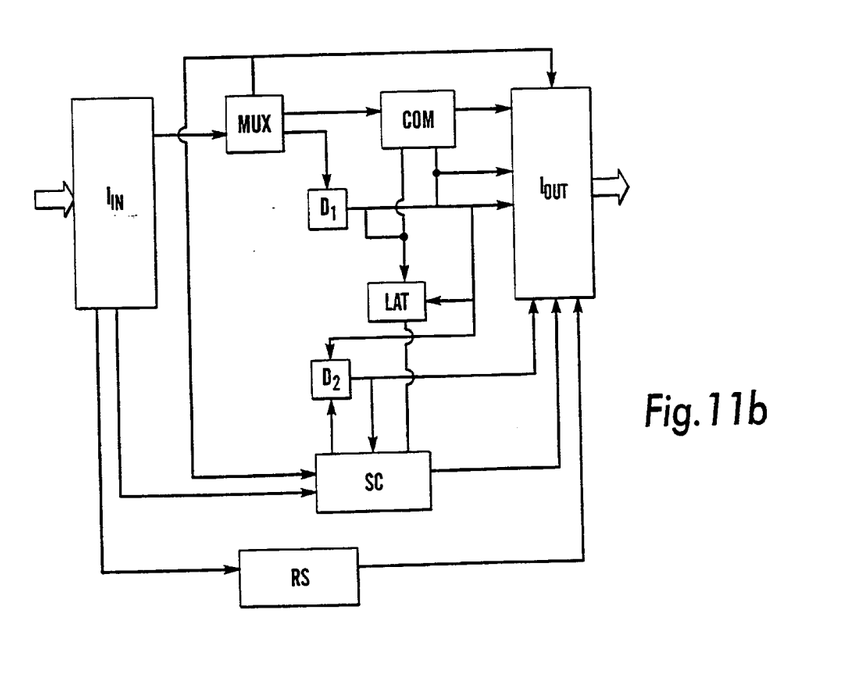

The kernel processor $P_0$ is generally shown in FIG. 11$a$ and comprises a combinatorial unit C connected with a memory unit M. The interface $I_{P_0}$ in the kernel processor $P_0$ which is of course is identical with the interface I of the remaining circuits $P_1$, ... $P_n$ is on the side of $P_0$ schematically indicated with arrows denoted "In" and "Out" for respectively the input side and the output side. The combinatorial unit C receives on the input side data in form of operative parameters which comprise the data which shall be processed. In additon the input side also supplies data in the form of configuring parameters for the kernel processor $P_0$. These configuring parameters may consist of instructions as well as setting parameters for subelements in the combinatorial unit C and the memory unit M. If the data which shall be processed are in the form of structures with repeated sequences and/or nested patterns and the processing of the data is specifically directed towards determined sequences and patterns with use of a comparatively limited set of instructions, the memory unit may advantageously wholly or partly be configured as a register unit R, as each register unit may comprise a plurality of registers with respectively fixed length and address, dependent on the operations which shall be executed in the processing. The output side of the interface delivers the results of the processing, for instance to a not shown external in/out interface for the whole processing device $P_n$ or delivers the results to other kernel processing units $P_0$ in the circuits $P_1$ or to the input interfaces in circuit $P_2$, $P_3$, ... $P_n$ on the overlying levels $S_2$, $S_3$, ... $S_n$ A specific embodiment of the circuit $P_1$ for use in a search processor device is shown somewhat schematically, but with all main components in FIG. 11$b$. The interface is shown respectively as an input interface $I_{in}$, and an output interface $I_{out}$. The input interface $I_{in}$, is connected with a multiplexer MUX with outputs respectively to the output interface $I_{out}$, a comperator unit COM which corresponds to the kernel processor $P_0$, a first D flip-flop and a sequence control unit SC. The comparator unit COM is used in a search operation for comparing characters or strings of characters which form given patterns. In this manner it can be determined whether a given pattern can be retrieved in a form of one or more elements in a set created of different patterns. The comparator unit COM delivers the received data on to the output interface $I_{out}$ and the result of the comparison to a latency unit LAT which can be used for delaying a positive binary value for a given number of cycles. The latency unit LAT is hence via the D flip-flop $D^1$ connected with an output on the multiplexer MUX and itself delivers the result of the comparison further to the sequence control unit SC which is adapted respectively to require that the kernel processor connected before or after the present one reports a match before the present kernel processor itself can report a match, to allow a comparison of patterns in case certain parts of the pattern are missing and additionally a comparison of patterns where certain parts of the pattern may be repeated. The sequence control unit SC is on the input side connected with the D flip-flop $D^1$ and on the output side with the D flip-flop $D_2$, the number of flip-flops being identical to the number of characters which are compared with the comperator unit COM. The sequence control unit SC must be able to receive results from a comparison operation in preceeding or succeeding processor units and is hence connected with the input interface $I_{in}$ and the multiplexer MUX and itself reports the results of the comparison operation further via output interface $I_{out}$. Finally the circuit $P_1$ in this embodiment also comprises a result selector RS which is used for combining two result values from other kernel processors or other result selectors. The result selector RS is thus connected with respectively the input interface $I_{in}$ and the output interface $I_{out}$ and can perform Boolean operations on two result values or compare operations of the type greater than, less than, or equal to over a set of processors.

In a specific embodiment a digital processing device P can be adapted to different types of numeric computation in massive parallelism and the combinatorial unit C and a register unit R will then be configured as arithmetic logic unit ALU. Each kernel processor $P_0$ can additionally comprise a memory unit M configured as RAM and hence implement an intelligent RAM (IRAM) such that latency problems are reduced or eliminated in a data processing of this kind.

On each nested level $S_1$, $S_2$, ... S there is additionally provided a further circuit in the form of a logic unit E which in itself may be a processor unit consisting of a combinatorial unit C and a register unit R. The logic unit E is generally identical for all circuits $P_1$, $P_2$, ... $P_n$. For example, in the circuit P the logic unit E corresponds to all components in FIG. 11b with the exception of the interface I and the comparator (kernel processor) COM. In a regular binary tree the circuit $P_1$ in FIG. 11b will of course have two kernel processors, that is two connected comparator units COM. Advantageously the circuit E on each level $S_1$, $S_2$, ... $S_n$ then functions as a processing unit with the purpose of configuring the network on the respective level and possibly underlying levels where the circuit E is located in each node in the network. By supplying the circuit E which suitable network-configuring parameters, a network on a given level can be configured optimally for the processing task which shall be executed. The logic unit E is adapted to be connected with nodes on the same or underlying levels in neighbour trees and can with basis in a regular tree structure transform this into more or less complex graphs and networks in order to better handle task-specific data volumes and data rates, for instance in problems which do not lend themselves to a balanced partitioning.

Figure 12A:
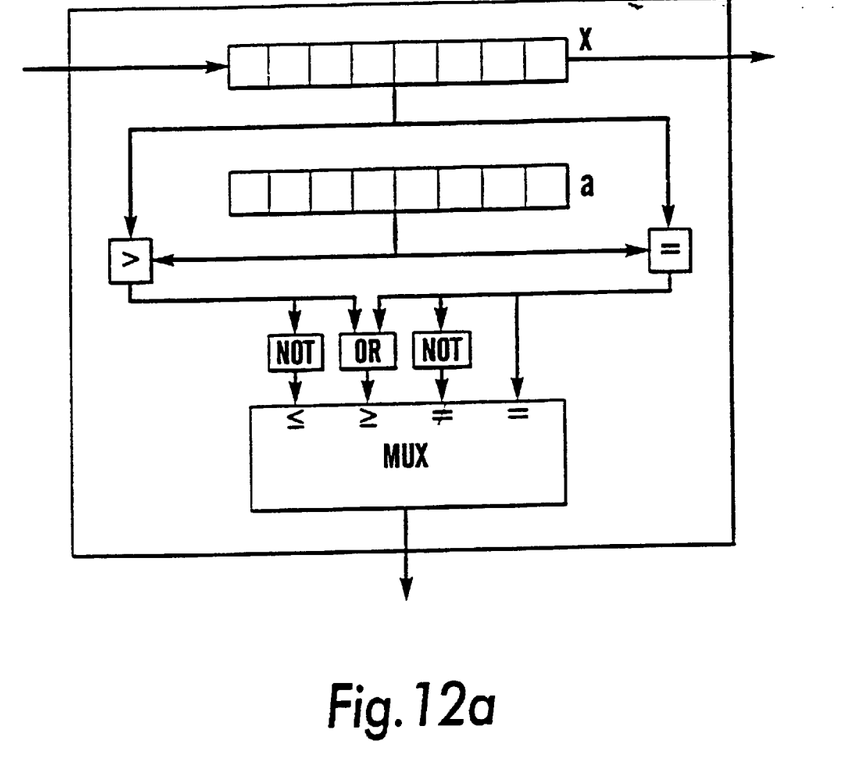
Figure 12B:
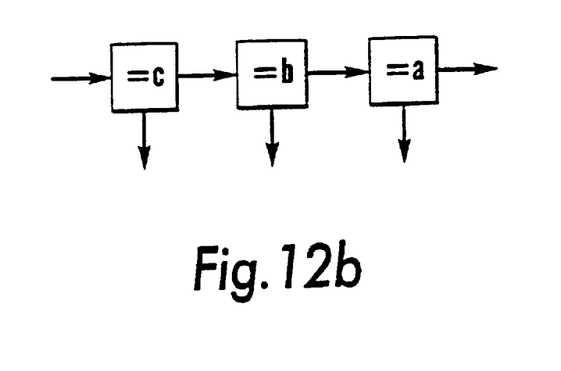

The combinatorial unit in the kernel processor $P_0$ realized as a comparator unit COM and used in a search processor device is shown in FIG. 12a. A register x contains the dataword which momentarily is located in the comparator unit COM and the register a comprises the dataword which x shall be compared to. It is from FIG. 12a easily seen that four comparisons can be performed, viz. x=a, x≧a, x≠a or x≦a, and the result is delivered to the output of the multiplexer MUX. With an interconnection of the comparator units as shown in FIG. 12a, simple patterns in the form of character strings can be compared. The principle in shown in FIG. 12b where the illustrated and interconnected units may be able to compare the string abc, that is an a directly followed by a b, directly followed by a c.

If the processing device according to the present invention shall be implemented as a search processor device, an unreduced and balanced binary tree may be used. For each inner node in the tree, that is all nodes with exception of the root node and the leaf nodes, a multiplexer is used for deciding whether two subtrees shall receive the same data elements in parallel and whether they shall receive data sequentially. This corresponds to connecting nodes on two different levels in neighbour trees, as already mentioned.

Figure 12C:
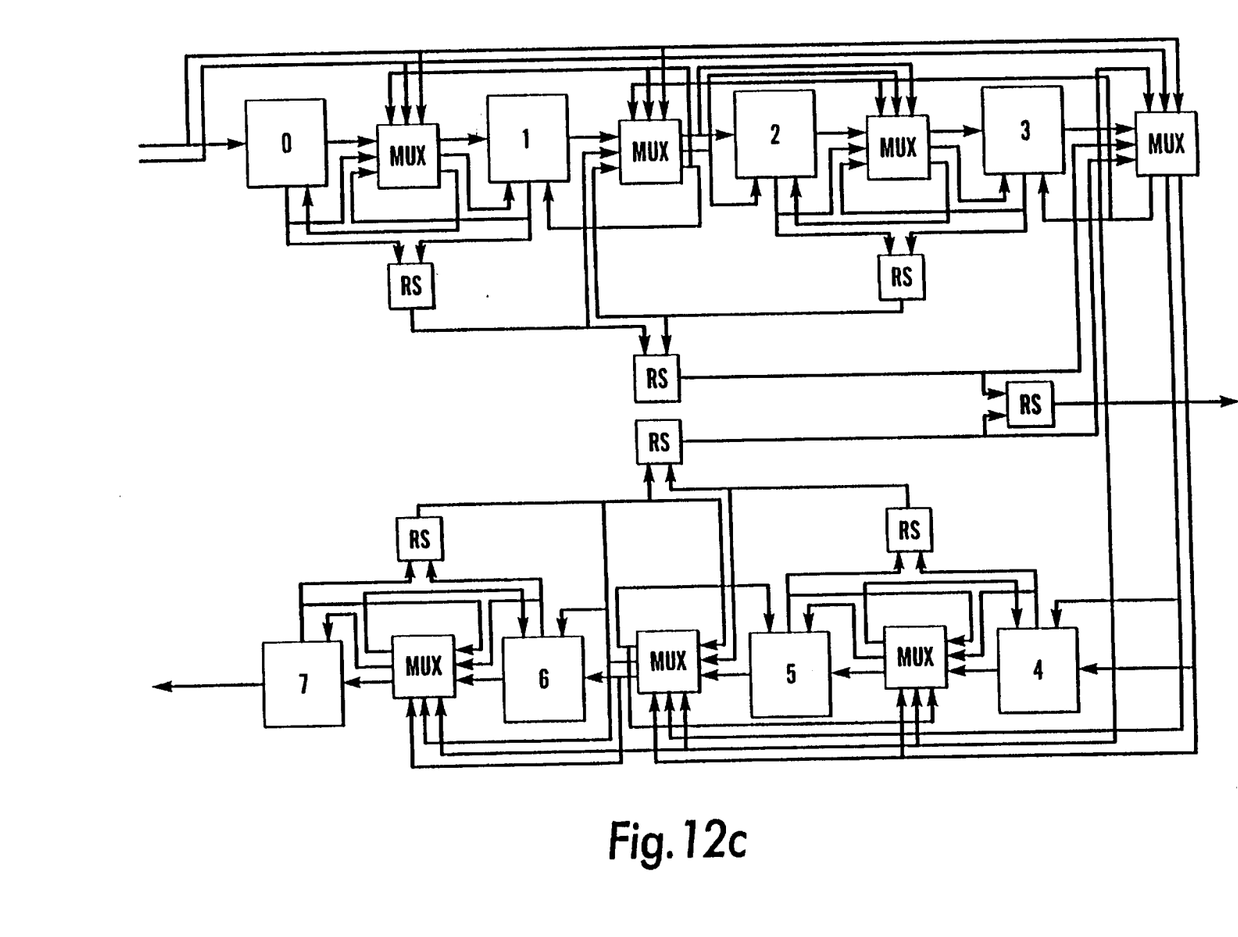

FIG. 12c shows a search processor device realized as a binary tree with 8 kernel processors, here shown as circuits 0, 1, ... 7. In this connection it shall be remarked that when the results are fetched from two circuits or two kernel processors, these will be combined with the use of logic operations. This takes place in the result selector RS. The logic unit E in each circuit comprises as shown in FIG. 11b a result selector RS which also allows that only one of the results is selected. The result selectors used in a binary tree will in other words give a single result from a group of processor units. Simultaneously the search processing device in the form of a binary tree shall also fetch the results from a comparison of characters or character strings executed before or after the comparison of the character or the character strings which for the moment are processed by the kernel processor or the comparator unit COM. By using a sequence control unit in the logic unit the tree can be configured such that a comparison operation can be performed by choosing the results either to the right or to the left for any of the elements which compare different characters or character strings. When a plurality of comparator units additionally compares the same characters or character strings, will their preceding and succeeding results be the same. These results may be found by the same multiplexer MUX which controls the data stream being used, such that a comparison result is communicated further to any of the neighbour elements which compare the same characters or character strings. This is also realized in the search processor device as shown in FIG. 12c. In this connection it shall be remarked that the same multiplexer set now is used for three separate purposes, namely for distributing data, for routing memory bits through the number of flip-flops and to provide or supply the results from comparisons of proceeding or following characters or character strings. The results from different kernel processors can however be combined by using a look-up table unit which can be connected between the subtrees and the output of the search processor device. The look-up table unit will then replace the result selectors RS shown in FIG. 12c.

The nested and possibly recursively generated processing device P according to the invention can be used for realizing task-specific processing devices for processing large data volumes in massive parallelism. Examples of such tasks may be searching in large data volumes structured in the form of documents, where the search takes place in simultaneous parallel in all or a large number of documents and can for instance be directed towards retrieval, identification and comparison of patterns. Further the processing device according to the invention can for instance be configured for image processing, encryption and decryption as well as processing based on a recursive procedures generally. Applied as purely numerical processor, the processing device according to the invention could be adapted for factorisation.

The kernel processors $P_0$ can as mentioned be based on standard microelectronic components and these may for instance be implemented as a so-called field programmed gate array (FPGA) or an application specific integrated circuit (ASIC), in both cases with a varying scale of integration. As the processing device according to the invention can be scaled in several dimensions, for instance with regard to processing capacity or connectivity, the realization is however not bound to a determined technology or a determined technological level, but may in practice be implemented based on the at any time available technological level, such that the performance of the processing device can be improved in step with the technological development.

In principle the processing device P according to the present invention could be realized with arbitrary degree k and an arbitrary number n+1 levels S. In each case the number of kernel processors will be given by $k^n$. In reality both k and n will be limited by the microelectronic technology which is available for realizing processing device P and particularly then the available integration scale. Dependent of both technology and the specific processing tasks which processing devices P shall be realized for, the chosen values for k an n can be made the object of a balanced judgement, for instance dependent on the need for parallelism and degree of partitioning. In a practical realized implementation the processing device $P_n$ for instance is realized with k=8 and n=3, that is 512 kernel processors $P_0$ on the level $S_0$.

By using standard microelectronics based on a conventional inorganic semiconductor technology, for instance silicon technology, the connectivity, that is the interconnection of the circuits in a network may offer problems in the form of complexity and long signal paths if the processing device P is realized integrated in a substantial planar technology on a substrate. In principle the network however is reconfigurable, that is that a network configured for one task may be configured in to another network, for instance with the use of suitable configuring parameters via the logic unit E. For certain tasks within massive parallel processing it may however be desirable with a higher degree of connectivity and ideally with total connectivity, that is every node being mutually connected. In this case the degree of connectivity for m nodes scales as $m^2/2$ and shall even for a limited number m, for instance 512 be difficult to realize with use of conventional circuit topologies. A possibility for realizing a circuit topology is to stack circuits based on organic thin-film technology above each other in a volumetric configuration and using both vertical and horizontal conducting structures for generating connections between the separate nodes or circuits, such that a three-dimensional network topology is obtained which will allow a very high degree of connectivity. Such technologies are disclosed in NO patent application 19982518 (Gudesen, Leistad & Nordal) which is directed towards an integrated scalable data processing device with MIMD architecture and realized as a volumetrically structured unit, i.a. with optimal network topologies and high degree of connectivity for massive parallel processing.

What is claimed is:

1. A digital processing system P, for processing of digital data and signal structures, wherein the data and signal structures comprise repeated sequences and/or nested patterns, the digital processing system comprising:

a regular tree with n+1 levels $S_0, S_1, \ldots S_n$ and of degree k, where n and k are numbers;

a circuit $P_n$ on the level $S_n$ and that forms the root node of the tree, such that the nearest level $S_{n-1}$ is provided nested in the circuit $P_n$;

k circuits $P_{n-1}$ which form the child nodes of the root node, and an underlying level $S_{n-q}$ in the circuit $P_n$, where $q \in \{1,2 \ldots n-1\}$; including $k^q$ circuits $P_{n-q}$ provided nested in the $k^{q-1}$ circuits $P_{n-q+1}$ on the overlying level $S_{n-q+1}$, each circuit $P_{n-q+1}$ on this level including k circuits $P_{n-q}$, such that a defined zeroth level $S_{n-q}=S_0$ in the circuit $P_n$ for q=n includes from $k^{n-1}+1$ to $k^n$ circuits $P_0$ which constitute kernel processors in the processing system P and on this level $S_0$ form leaf nodes in the tree, the kernel processor $P_0$ being provided nested in a number of 1 to k in each of the $k^{n-1}$ circuits $P_1$ on the level $S_1$, such that each of the circuits $P_1, P_2 \ldots P_n$ on respective levels $S_1, S_2 \ldots S_n$ includes comprises a logic unit E which is connected with those circuits $P_0, P_1 \ldots P_{n-1}$ on the respective nearest underlying level $S_0, S_1 \ldots S_{n-1}$ provided nested in the respective circuits $P_1, P_2, \ldots P_n$ and configures a network of the former circuits in the respective circuits $P_1, P_2 \ldots P_n$, wherein each of the circuits $P_0$, $P_1 \ldots P_n$ has identical interfaces I.

2. A digital processing device according to claim 1, wherein the zeroth level $S_0$ comprises $k^n$ kernel processors $P_0$, such that a kernel processor $P_0$ recursively maps a circuit $P_1$ on the overlying level with a mapping factor r=k, such that the tree is an unreduced or complete tree, and that a circuit $P_{n-q}$ on the level $S_{n-q}$ maps recursively a circuit $P_{n-q+1}$ on the overlying level $S_{n-q+1}$ with the factor r=k.

3. A digital processing system P according to claim 1, wherein the zeroth level $S_0$ comprises $rk^{n-1}$ kernel processors $P_0$, 1<r<k, such that a kernel processor $P_0$ maps a circuit $P_1$ on the overlying level $S_1$ with the mapping factor r, 1<r<k such that the tree is a symmetrically reduced or balanced tree, and that generally a circuit $P_{n-q}$ on all levels from the level $S_1$ maps a circuit $P_{n-q+1}$ on the overlying level $S_{n-q+1}$ recursively with the mapping factor r=k.

4. A digital processing system P according to claim 1, wherein respectively from 1 to k kernel processors are provided nested in each circuit $P_1$ on the level $S_1$, such that at least one of the circuits $P_1$ includes at least 2 and at most k-1 kernel processors $P_0$, such that the total number of kernel processors $P_0$ on the level $S_0$ is at least $k^{n-1}+1$ and at the most $k^n-1$ and the tree becomes an asymmetrically reduced or unbalanced tree, and that generally a circuit $P_{n-q}$ on the level $S_{n-q}$ is mapped by the circuits $P_{n-q-1}$ nested in the respective circuit $P_{n-q}$.

5. A digital processing system P according to claim 1, wherein the kernel processor $P_0$ at least comprises one combinatorial unit C and a memory unit M connected with at least one combinatorial unit C.

6. A digital processing system P according to claim 5, including at least a part of the memory unit M is configured as a register unit R.

7. A digital processing system P according to claim 6, wherein at least one combinatorial unit C and a register unit R are configured as an arithmetic logic unit ALU.

8. A digital processing system P according to claim 1, wherein the logic unit E comprises at least one combinatorial unit C and a register unit R connected with the at least one combinatorial unit C.

9. A digital processing system P according to claim 8, wherein at least one combinatorial unit C is a multiplexer.

10. A digital processing system P according to claim 9, wherein the logic unit E in a circuit $P_{n-q}$ is adapted to be connected with the logic unit E in a corresponding circuit $P_{n-q}$ on the same level $S_{n-q}$ in a neighbor tree.

11. A digital processing system P according to claim 9, wherein the logic unit E in a circuit $P_{n-q}$, is adapted to be connected with the logic unit E in circuits $P_{n-q-1}, P_{n-q-2}, \ldots P_1$ on respective underlying levels $S_{n-q-1}, S_{n-q-2}, \ldots S_1$ in a neighbor tree.

12. A digital processing system P according to claim 11, wherein the logic unit E in a circuit $P_{n-q}$ is adapted to be connected with one or more kernel processors $P_0$ in a neighbor tree, either directly or via the logic unit E in the circuit $P_1$, where the kernel processor $P_0$ or the kernel processors $P_0$ in question are nested.

* * * * *